United States Patent
Ellis et al.

(10) Patent No.: US 8,251,086 B2
(45) Date of Patent: Aug. 28, 2012

(54) ROTARY GATE VALVE WITH SECONDARY SEAL

(75) Inventors: Johnny Ellis, Reno, NV (US); David Gambetta, Reno, NV (US); John Muran, Reno, NV (US); Viet Nguyen, Reno, NV (US)

(73) Assignee: Tyco Valves & Controls, LP, Houston, TX (US)

( * ) Notice: Subject to any disclaimer, the term of this patent is extended or adjusted under 35 U.S.C. 154(b) by 164 days.

(21) Appl. No.: 12/837,908

(22) Filed: Jul. 16, 2010

(65) Prior Publication Data

US 2010/0314570 A1   Dec. 16, 2010

Related U.S. Application Data

(63) Continuation-in-part of application No. 11/961,846, filed on Dec. 20, 2007, now abandoned.

(51) Int. Cl.
*F16K 3/04* (2006.01)
(52) U.S. Cl. ........................... 137/242; 251/302
(58) Field of Classification Search ................... 251/298, 251/300–302, 214, 326–329; 137/242
See application file for complete search history.

(56) References Cited

U.S. PATENT DOCUMENTS

| | | | | |
|---|---|---|---|---|
| 88,008 A * | 3/1869 | Chase et al. | ........... | 251/301 |
| 360,167 A * | 3/1887 | Lunkenheimer | ........... | 251/89 |
| 921,209 A * | 5/1909 | Demarest | ........... | 251/284 |
| 2,805,836 A * | 9/1957 | Taylor | ........... | 251/177 |
| 2,986,367 A * | 5/1961 | Le Rouax | ........... | 251/1.3 |
| 3,071,340 A * | 1/1963 | Nixon | ........... | 251/65 |
| 3,154,287 A * | 10/1964 | Clandinin | ........... | 251/214 |
| 3,198,482 A * | 8/1965 | Bertels | ........... | 251/302 |
| 3,203,664 A * | 8/1965 | Ver Nooy Burton | ........... | 251/302 |
| 3,279,494 A * | 10/1966 | Nixon | ........... | 137/416 |
| 3,837,356 A * | 9/1974 | Selep et al. | ........... | 137/375 |
| 4,257,447 A * | 3/1981 | Clarkson | ........... | 137/375 |
| 4,432,387 A * | 2/1984 | Sims | ........... | 137/329.02 |
| 4,679,768 A * | 7/1987 | Hardy | ........... | 251/159 |
| 4,693,447 A * | 9/1987 | Perez | ........... | 251/129.12 |
| 5,137,261 A * | 8/1992 | Clifford | ........... | 251/328 |
| 5,205,317 A * | 4/1993 | Neuerberg et al. | ........... | 137/242 |
| 5,318,275 A * | 6/1994 | Sargent et al. | ........... | 251/229 |
| 5,836,336 A * | 11/1998 | Warzecha | ........... | 137/15.23 |
| 5,890,700 A * | 4/1999 | Clarkson et al. | ........... | 251/327 |
| 7,059,586 B2 * | 6/2006 | Vanderberg et al. | ........... | 251/328 |
| 8,056,882 B2 * | 11/2011 | Ohlson et al. | ........... | 251/326 |

* cited by examiner

*Primary Examiner* — John Bastianelli

(57) ABSTRACT

A rotary gate valve includes first and second opposing housing members having coaxial pathways and defining a gate channel when joined together. A gate is positioned within the gate channel when the valve is in a closed position to prevent media from flowing through the pathways and rotationally displaced from the channel when the valve is in an open position to allow media to flow through the pathways. First and second annular primary sealing sleeves are disposed within the first and second housing members and are adapted to sealingly engage each other when the valve is in the open position, and with the gate valve when the valve is in the closed position. A secondary sealing member is disposed around an upper portion of the gate and secured between the housing members above the first and second annular primary sealing sleeves to prevent process media from entering the housing members.

6 Claims, 4 Drawing Sheets

ROTARY GATE VALVE WITH SECONDARY SEAL

CROSS-REFERENCE

This application is a continuation-in-part of U.S. patent application Ser. No. 11/961,846, filed Dec. 20, 2007, which is expressly incorporated by reference herein in its entirety.

BACKGROUND OF THE INVENTION

The present invention relates generally to the field of flow control valves and the construction thereof. More specifically, the present invention relates to a rotary gate valve that provides faster operation and occupies less vertical space within a process pipeline.

Flow control valves such as, for example, knife gate valves or line blind valves, are used to control the flow of process media and can be particularly well suited for use with abrasive and corrosive slurries used in, for example, the mining, pulp or paper industries. One form of gate valve known in the art includes a housing and passageway therethrough. On opposite sides of the housing are connections for installing the valve in a pipe line, for example, the housing can be bolted to a flange end of a pipe. To control the flow of fluid through the valve, the valve includes a knife gate that is disposed within the valve body. In operation, when the knife gate is raised vertically, the valve is open and process media flows through the passageway. When the knife gate is lowered vertically, the valve is closed and process media is prevented from flowing through the passageway. Because typical knife gate valves operate vertically, actuators must be mounted on top of the gate valve. This requires significant space above the valve for the actuator and valve package in an already crowded process pipeline environment. Thus, there is a need for a gate valve that operates quicker than existing gate valves while reducing valve package vertical space requirements.

SUMMARY OF THE INVENTION

Preferred embodiments of the inventions are directed to a rotary gate valve comprising a first and second opposing housing members each having coaxial pathways and defining a gate channel when the housing members are joined together. A gate is positioned within the gate channel when the valve is in a closed position to prevent media from flowing through the pathways and rotationally displaced from the channel when the valve is in an open position to allow media to flow through the pathways. A first annular primary sealing sleeve is disposed within the first housing member and a second annular primary sealing sleeve is disposed within the second housing member. Each of the first and second annular primary sealing sleeves is adapted to sealingly engage each other under compression when the valve is in the open position, and with the gate when the valve is in the closed position. A secondary sealing member is disposed around an upper portion of the gate and secured between the housing members above the first and second annular primary sealing sleeves. The secondary sealing member has an aperture extending therethrough and an inner peripheral wall around the aperture adapted to sealingly engage the upper portion of the gate. The secondary sealing member is configured to prevent process media from entering the housing.

DETAILED DESCRIPTION

Figure 1:
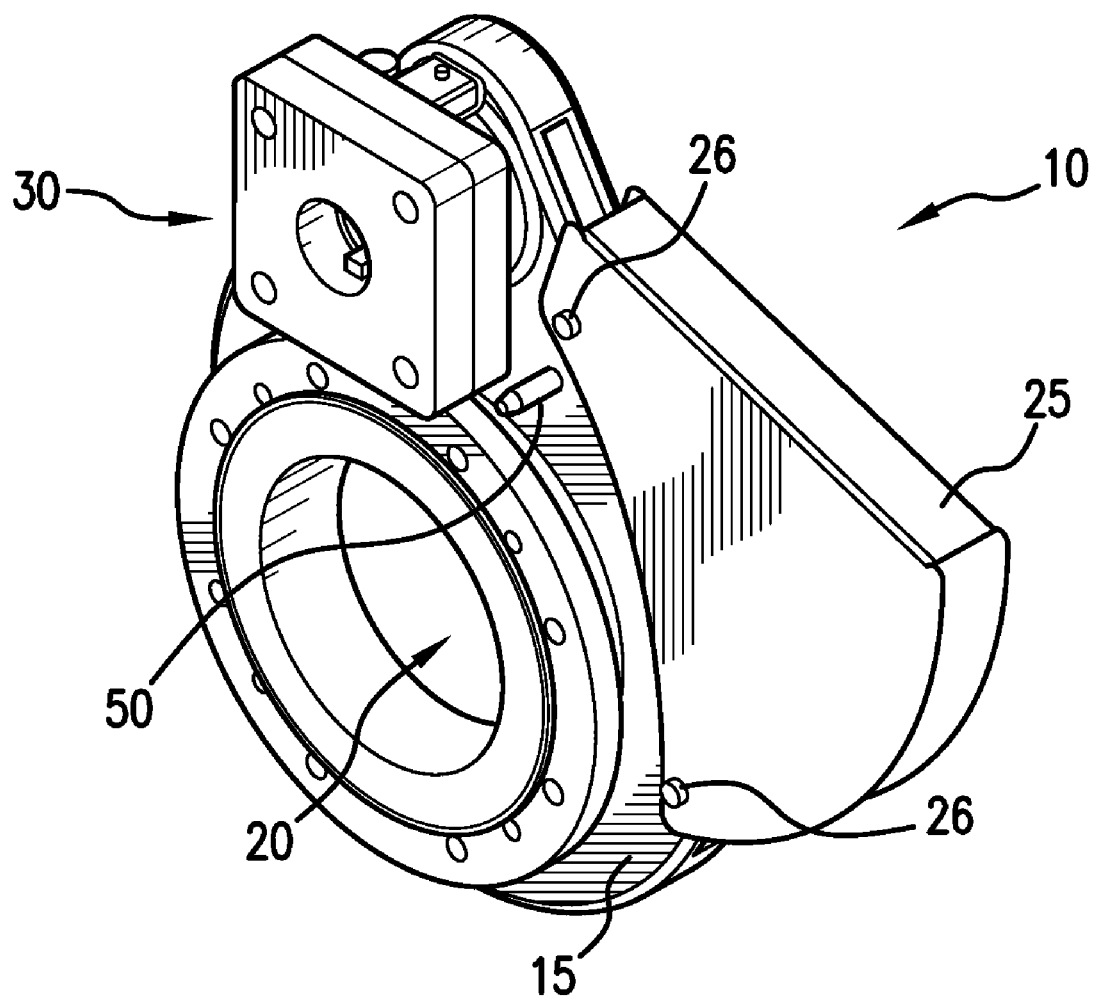
FIG. 1 is a perspective view of a rotary gate valve in accordance with an exemplary embodiment of the present disclosure.

FIG. 1 is a perspective view of an embodiment of a rotary gate valve in axial alignment within a pipeline in accordance with the present invention. Valve 10 generally includes valve housing 15 defining a pathway or channel 20 having an inlet and outlet through which process media flows along a flow axis. Valve 10 is connected to a process pipeline via flange assemblies and housing 15. Valve shaft assembly 30 located at an upper portion of housing 15 allows a valve gate to swing open to allow process flow through valve 10 and swing closed to prevent process flow through valve 10. Gate guard 25 is connected to housing 15 via fasteners 26 and is used to protect the gate from external exposure. An actuator may be connected to valve shaft assembly 30 to open and close the gate. Various types of actuators may be used including pneumatic, hydraulic and electric to open and close valve 10. An actuator and valve package, including for example, a manifold can be mounted parallel to the flow axis to avoid vertical component stacking.

Figure 2:
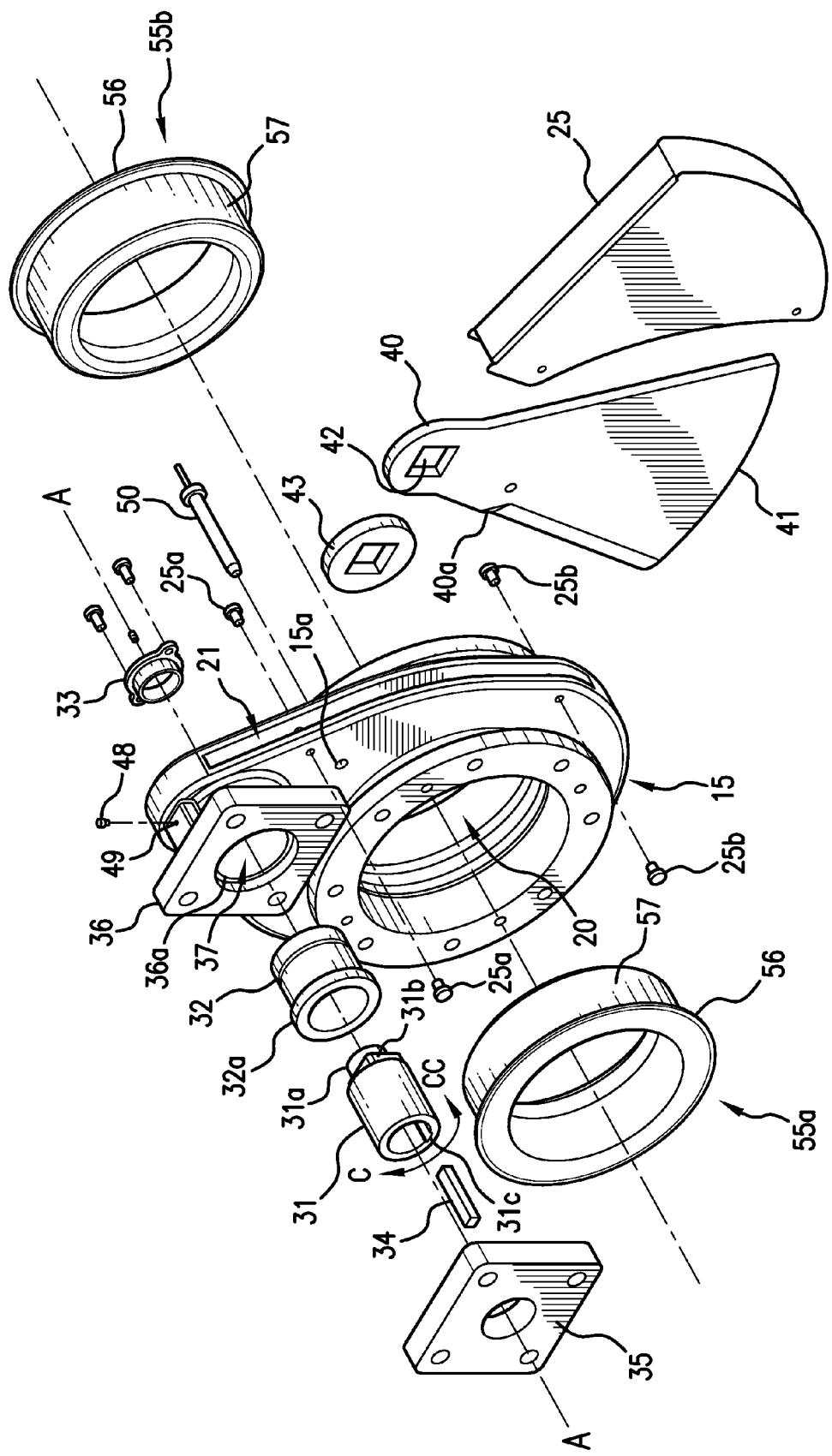
FIG. 2 illustrates an exploded view of the rotary gate valve shown in FIG. 1 in accordance with an exemplary embodiment of the present disclosure.

FIG. 2 is an exploded view of the rotary gate valve 10 shown in FIG. 1. Gate 40 has a substantially teardrop shape with a curved lower portion 41 and shaft aperture 42. Gate 40 is positioned within housing channel 21. When valve 10 is in a closed position, gate 40 completely covers pathway 20. Washers 43 are disposed between gate 40 and housing 15 to prevent gate 40 from rubbing and galling. Lubrication may be supplied to gate 40 via grease fitting 48 and corresponding channel 49. Gate guard 25 is attached to housing 15 via fasteners 25a and 25b. Guard 25 may be made from, for example, sheet metal or other material sufficient to protect gate 40 from environmental conditions as well as protecting users from external contact with the gate when valve 10 is in an open position.

Gate valve 10 includes shaft assembly 30 located at an upper portion of housing 15. Shaft assembly includes shaft 31, bushings 32 and 33, actuator key 34, actuator spacer 35 and housing flange 36. Shaft 31 is positioned within bushing 32 through shaft orifice 37 along axis A-A which is above and parallel with the flow axis of pathway 20. Shaft 31 has a first round end 31a connected to bushing 33 and a rectangular portion 31b which engages shaft aperture 42 of gate 40. Although portion 31b is shown have a rectangular shape, alternative configurations may be used to provide engagement with shaft aperture 42. As shaft 31 rotates in counterclockwise direction (CC) upon actuation, rectangular portion 31b engages shaft aperture 42 and applies the rotational force of shaft 31 to gate 40 in direction CC. This counterclockwise movement forces gate 40 outside the axis of valve housing 15 into an open position where gate 40 is completely withdrawn from the process flow. Gate guard 25 surrounds gate 30 when valve 10 is in this open position. Likewise, as shaft 31 rotates in a clockwise direction (C) upon actuation, rectangular portion 31b applies the rotational force of shaft 31 to gate 40 via shaft aperture 42 to rotate gate 40 in direction C. This clockwise C movement of gate 40 returns the gate inside valve housing 15 via channel 21 to close the valve. Because of its rotational configuration, gate 40 only has to travel approximately ¼ turn to go from a closed position to an open position.

Housing spacer 36 includes a ridge portion 36a which receives rim 32a of bushing 32. Bushing 32 receives shaft 31 and actuator key 34 is received by channel 31c of shaft 31. Actuator spacer 35 is connected to housing spacer 36 and receives an external actuator used to open and close valve 10. Bore 15a extends through each side of housing 15 and is aligned with lockout hole 40a of gate 40. When gate 40 is in an open position, lockout pin 50 may be inserted through bore 15a and hole 40a to prevent gate 40 from closing. This lockout function may be used in addition to actuator control.

Valve 10 also includes a pair of sleeves 55a and 55b having an inner diameter corresponding to the size of channel 20. Sleeves 55a and 55b are compressed into housing 15. Because a pair of sleeves is used, the downstream sleeve (either sleeve 55a or 55b depending on the installation configuration) can be replaced when gate 40 is in a closed position while the upstream sleeve still holds pressure. Sleeves 55a and 55b may be made from, for example, rubber, EPDM, CSM or other similar type material depending on the type of process application. Each of sleeves 55a and 55b include flange portions 56 and body portion 57. Body portions 57 fit within housing 15 and flange portions 57 fit around pathway 20. Sleeves 55a and 55b create a seal on each side of gate 40 when in a closed position and prevent leakage when gate 40 is in an open position. Retainer flanges (not shown) are disposed between each sleeve 55a and 55b and the process pipeline. These flanges retain sleeves 55a and 55b in position relative to valve housing 15.

Figure 3:
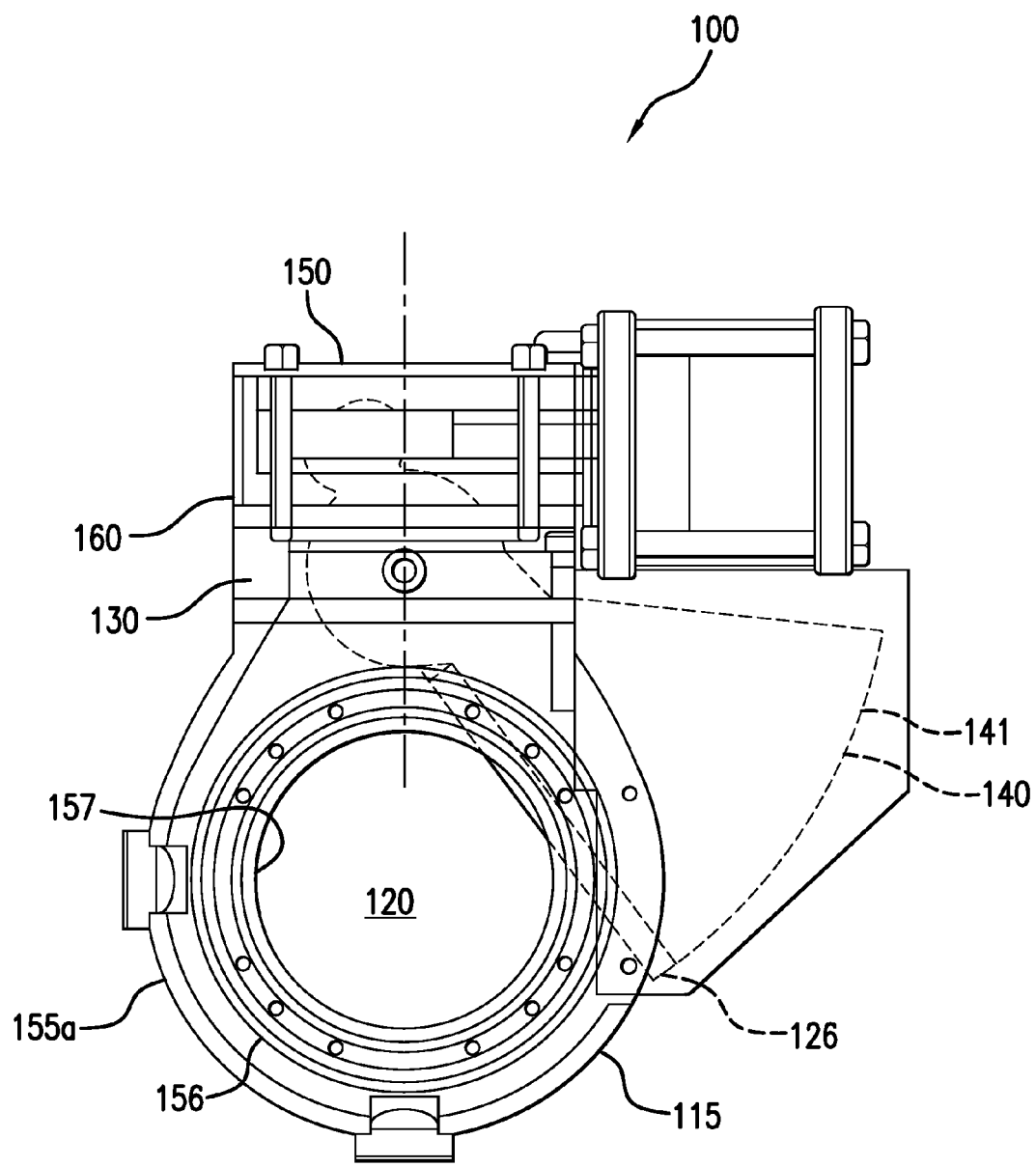
FIG. 3 is a side view of an exemplary rotary gate valve in an open position in accordance with an exemplary alternative embodiment of the present disclosure.

FIG. 3 illustrates an exemplary rotary gate valve 100 according to an alternative embodiment of the present disclosure in an open position. Valve 100 generally includes valve housing 115 defining a pathway or channel 120 having an inlet and outlet through which process media flows along a flow axis. Valve housing 115 may be formed from a pair of opposing housing halves having coaxial channels within which a rotary gate 140 is disposed. Valve 100 is connected to a process pipeline via flange assemblies and housing 115. A valve shaft assembly 130 provides a pivot point for rotary gate 140 which allows the gate to swing open to allow process flow through valve 100 and swing closed to prevent process flow through valve 100. A gate guard 145 is connected to housing 115 via fasteners 126 and is used to protect the gate from external exposure. An actuator adapter assembly 150 may be connected to valve 100 to allow an actuator to be coupled to valve 100 to open and close the rotary gate 140 via shaft assembly 130. Various types of actuators may be used including pneumatic, hydraulic, electric, manual, etc.

A primary seal between the rotary gate 140 and the housing 115 is formed by a pair of sleeves. A first of the pair of sleeves 155a is shown in FIG. 3 and a mirror image of this sleeve is disposed at the other opening of channel 120 similar to sleeves 55a and 55b described above with reference to FIG. 2. Each of the pair of sleeves has an inner diameter corresponding to the size of channel 120. Each of sleeves include flange portions (e.g. 156) and body portion 57. Body portions 157 fit within housing 115 and flange portions 156 fit around pathway 120 to create a seal between valve 100 and a process pipeline attached to the upstream and downstream sides of the valve. The sleeves form a gate channel through which rotary gate 140 travels. In addition, the sleeves create a seal on each side of gate 140 when valve 100 is in a closed position and prevent leakage when gate 140 is in an open position. Because a pair of sleeves is used, the downstream sleeve can be replaced when gate 40 is in a closed position while the upstream sleeve still holds pressure. Sleeves 55a and 55b may be made from, for example, rubber, EPDM, CSM or other similar type material depending on the type of process application.

Figure 4:
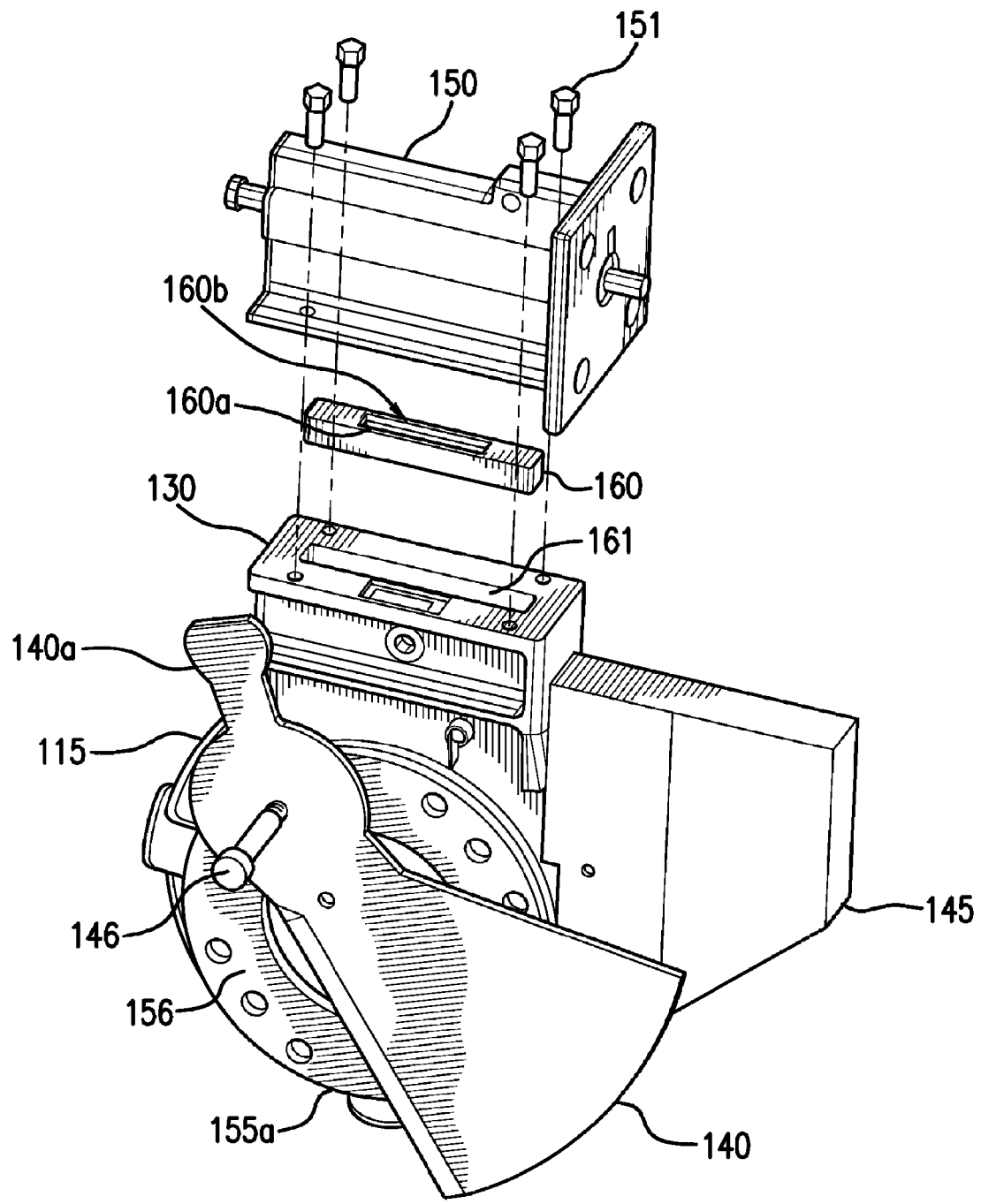
FIG. 4 is an exploded view of the rotary gate valve shown in FIG. 3 in accordance with an exemplary embodiment of the present disclosure.

The valve 100 includes a secondary sealing member 160 disposed between the first and second housing halves and surrounding the upper portion 140a of gate 140. Secondary sealing member 160 is configured to prevent process media leakage into housing 115 and actuator adapter assembly 150. Referring to FIG. 4 which is an exploded view of valve 100 with gate 140 shown as removed from the valve housing, the secondary sealing member 160 is disposed within slot 161 located above gate shaft 146 of housing 115. More particularly, secondary sealing member 160 is disposed within shaft assembly 130. Secondary sealing member 160 may be, for example, a unitary molded elastomeric material such as natural rubber or other suitable synthetic elastomer such as polyurethane, etc. Secondary sealing member 160 includes an inner peripheral wall 160a which defines an aperture 160b. This inner peripheral wall surrounds the upper portion 140a of gate 140. Secondary sealing member 160 is secured to housing 115 by actuator adapter assembly 150 and associated fasteners 151. While the primary sleeves prevent direct slurry line pressure on the secondary sealing member 160, the secondary sealing member 160 is itself capable of withstanding process media spray during actuation of gate 140. Secondary sealing member 160 replaces standard packing material around the upper portion of gate 140 to prevent leakage and to wipe excess process media from gate 140 as the gate moves between open and closed positions. Thus, there is no need for constant manual adjustment of secondary seal 160 such as in the case of conventional packing in order to stop valve leakage.

As mentioned above, an actuator may be mounted to actuator adapter assembly 150 which is used to displace gate 140 within housing 115. In particular, actuator adapter assembly 150 is configured to allow an actuator to engage the upper portion 140a of gate 140. The actuator may be configured to move in a linear direction thereby displacing the upper portion 140a of gate 140 perpendicular to the flow path and causing the gate to move in a clockwise or counterclockwise direction thereby closing and opening the valve. This counterclockwise movement forces gate 140 outside the axis of valve housing 115 into an open position where gate 140 is withdrawn from the process flow. Gate guard 145 surrounds gate 140 when valve 100 is in this open position. Likewise, as the upper portion 140a of gate 140 is displaced in the opposite direction by actuation, gate 140 rotates in a clockwise direction which returns the gate inside valve housing 115 to close the valve. Because of its rotational configuration, gate 140 only has to travel approximately ¼ turn to go from a closed position to an open position, thereby reducing actuation times.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A rotary gate valve comprising:

a first and second opposing housing members each having coaxial pathways, each of said housing members defining a gate channel when said housing members are joined together;

a gate positioned within said gate channel when said valve is in a closed position to prevent media from flowing through said pathways and rotationally displaced from said channel when said valve is in an open position to allow media to flow through said pathways, said gate having an elongated upper portion extending from a top of said gate above said pathways and adapted to engage a linear actuator for moving said upper portion along a linear path for rotating said gate about a pivot point intermediate said upper portion and the rest of said gate;

a first annular primary sealing sleeve disposed within said first housing member;

a second annular primary sealing sleeve disposed within said second housing member, each of said first and second annular primary sealing sleeves adapted to sealingly engage each other under compression when the valve is in the open position, and with the gate when the valve is in the closed position;

a secondary sealing member disposed around said upper portion of said gate and secured between said housing members above the first and second annular primary sealing sleeves, said secondary sealing member having an aperture extending therethrough and an inner peripheral wall around said aperture adapted to sealingly engage the upper portion of the gate, said secondary sealing member configured to prevent process media from entering the housing.

2. The valve of claim 1 further comprising a gate guard attached to said housing members, said gate guard substantially enclosing said gate when said valve is in an open position.

3. The valve of claim 1 further comprising a gate shaft disposed through said upper portion of said gate about which said gate rotates, said pathways having an axis which is parallel to said gate shaft.

4. The valve of claim 3 wherein rotation of said gate about said gate shaft from the open position to the closed position is defined by approximately a quarter turn of said gate.

5. The valve of claim 4 further comprising an actuator adapter mounted on said housing members, said actuator adapter configured to receive the actuator for rotating said gate.

6. The valve of claim 1 wherein each of said seat sleeves is molded from a rubber based material.

* * * * *